United States Patent [19]

Ray et al.

[11] 4,348,619
[45] Sep. 7, 1982

[54] VARIABLE RELUCTANCE ELECTRIC MOTOR SYSTEMS

[75] Inventors: William F. Ray, Nottinghamshire; Rex M. Davis, Loughborough, both of England

[73] Assignee: Chloride Group Limited, London, England

[21] Appl. No.: 187,838

[22] PCT Filed: May 25, 1979

[86] PCT No.: PCT/GB79/00083
§ 371 Date: Dec. 13, 1979
§ 102(e) Date: Dec. 13, 1979

[87] PCT Pub. No.: WO79/01134
PCT Pub. Date: Dec. 27, 1979

[30] Foreign Application Priority Data

May 26, 1978 [GB] United Kingdom ............... 22890/78

[51] Int. Cl.³ .................................. H02P 5/00
[52] U.S. Cl. .................... 318/139; 318/254; 320/2; 307/149
[58] Field of Search ............... 320/2, 21, 56; 318/139, 318/254; 307/149

[56] References Cited

U.S. PATENT DOCUMENTS

| 3,586,954 | 6/1971 | Carves ................... 320/2 |
| 3,820,000 | 6/1974 | Smith ................... 318/139 X |
| 3,956,678 | 5/1976 | Byrne et al. ................ 318/254 X |
| 3,970,912 | 7/1976 | Hoffman .................. 320/2 |
| 4,008,423 | 2/1977 | Christianson et al. ........... 318/139 |
| 4,049,998 | 9/1977 | Boxer .................... 318/139 X |
| 4,127,803 | 11/1978 | Etienne ................. 307/149 X |
| 4,236,107 | 11/1980 | Templin .................. 320/21 |

FOREIGN PATENT DOCUMENTS 2227147 11/1974 France ................. 318/139

*Primary Examiner*—J. V. Truhe
*Assistant Examiner*—Richard M. Moose
*Attorney, Agent, or Firm*—Oblon, Fisher, Spivak, McClelland & Maier

[57] ABSTRACT

A variable reluctance electric motor system including a variable reluctance motor having main windings (A,B,C,D) and auxiliary windings closely coupled to the main windings, a main storage battery for driving the motor terminals (10,11) (that will be referred to as DC supply terminals), and a power converter circuit (FIG. 2) for charging the battery from the DC supply, in which the motor is included in the power converter circuit to function as an isolating transformer to isolate the battery from the supply when on charge.

16 Claims, 11 Drawing Figures

MAINS SUPPLY — RECTIFIER CIRCUIT — POWER CONVERTER + MOTOR CIRCUIT — BATTERY

VARIABLE RELUCTANCE ELECTRIC MOTOR SYSTEMS

BACKGROUND OF THE INVENTION

Field of the Invention

This invention relates to variable reluctance electric motor systems in which the power for driving the motor is taken from a rechargeable battery. The invention is concerned with the charging of the battery from a main supply.

SUMMARY OF THE INVENTION

According to the present invention a variable reluctance electric motor system includes a variable reluctance motor having main windings and auxiliary windings closely coupled to the main windings, a main storage battery for driving the motor, D.C. supply terminals and a power converter circuit for charging the battery from the D.C. supply, in which the motor is included in the power converter circuit to function as an isolating transformer to isolate the battery from the supply when on charge.

The power converter circuit may include solid state switching devices supplying unidirectional pulses of current to a winding of each of one or more phases such pulses being synchronized with the rotation of the motor when driving the motor but free-running when charging the battery.

The invention is primarily, though not exclusively, applicable to variable reluctance motor systems incorporated in battery propelled vehicles. In the usual form of charger if a step down or step up of voltage is required a transformer is necessary and even where there is no change of voltage a transformer will generally be required to ensure isolation of the battery from direct connection to the main supply. In the case of a high-power charger the weight and bulk of a transformer for mains frequency will be very substantial, and the elimination of such a transformer may make it practical to carry the charger on the vehicle.

In a variable reluctance motor pulses of current are delivered from a D.C. supply to the phase windings of the motor, and transfer energy from the supply to a winding as the current rises, after which it is desirable to recover energy from the winding. This is commonly done by providing each phase of the motor with an auxiliary winding closely coupled to the main winding.

In accordance with the present invention these closely coupled main and auxiliary windings are used as a transformer when charging the battery from a main supply to isolate the battery from direct connection with the supply, and if necessary provide a change of voltage, thus eliminating the expense, space requirement and weight of a separate transformer.

Moreover, in such a variable reluctance motor system, each auxiliary winding is generally connected in series with a diode across the battery so that this portion of the circuit need not be disturbed when using the windings for charging.

Thus in one form of the invention each phase of the motor has a main winding connected in series with a main thyristor between the D.C. supply terminals, and an auxiliary winding closely coupled with the main winding and connected in series with a diode across the battery terminals, means being provided for firing and commutating the main thyristors, and means for connecting the D.C. supply terminals to a rectified A.C. main supply for charging the battery, and means for for connecting the D.C. supply terminals to the battery terminals for driving the motor.

The system may include a current transducer arranged to control the commutation of the switching devices to take place when the current reaches a predetermined value, when charging the battery. Alternatively or in addition it may include timing means arranged to introduce a predetermined time interval between pulses, when charging the battery. For example each pulse may be initiated under the control of a timer and commutated under the control of a current transducer when the current reaches a predetermined value.

For driving at low speed it will in any case generally be necessary for the variable reluctance motor to operate in a chopping mode, that is to say one in which the switching device of each phase is commutated when the current rises above a predetermined value and fired and commutated again, several times before a pulse to the next phase is initiated. For this purpose a current transducer must be provided, so that no separate current transducer will be needed for the charging mode.

The effective charging current can be controlled by varying the duty cycle of current pulses to give any desired characteristic of charging current to voltage and/or time, and monitored to terminate the charge in accordance with known criteria.

Many different forms of power converter circuit may be employed in putting the invention into practice, and some of them may be operated in a number of different ways. Some of these will be described below with reference to the accompanying drawings, while others are described in British Patent specifications Nos. 13416/77 (not filed in U.S.) 13415/77 (U.S. Pat. No. 4,253,053) (U.S. Ser. No. 187,835 filed Jan. 10, 1980) or (U.S. Ser. No. 187,837 filed Jan. 10, 1980).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
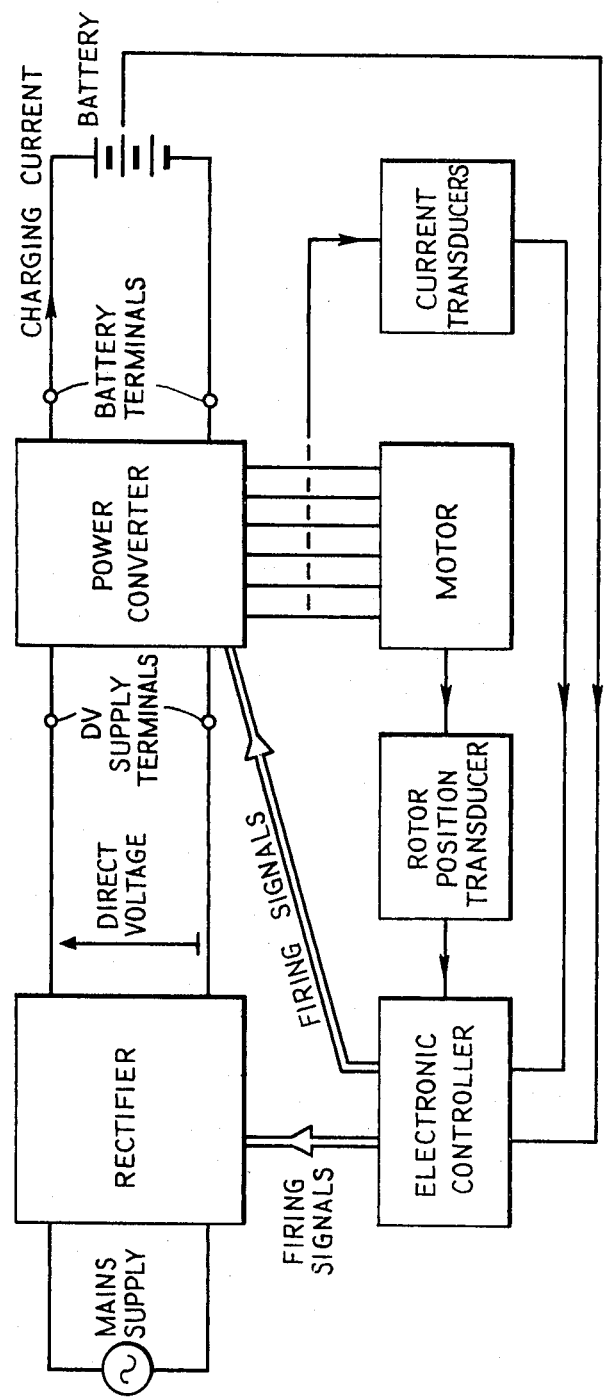
FIG. 1 is a block diagram of one form of variable reluctance motor system with a charging facility.

Referring to the drawings, wherein like reference numerals designate identical or corresponding parts throughout the several views, and more particularly to FIG. 1 thereof, FIG. 1 is a general block diagram of the proposed system. The rectifier, which is of known type and may be controlled or uncontrolled as is described later, is used to supply a D.C. voltage to the power convertor circuit. The power convertor circuit and variable reluctance motor may be any of the types described in the specifications referred to above, in which the motor has an auxiliary winding as well as a main winding for each phase.

The power convertor is interconnected with the motor and the switching devices in the convertor are controlled by means of an electronic controller, together with various transducers for measuring the motor currents, rotor position, and battery voltage and means for synchronising the rectifier if necessary to the A.C. main supply. In subsequent diagrams the electronic controller and transducers are not shown.

Figure 2:
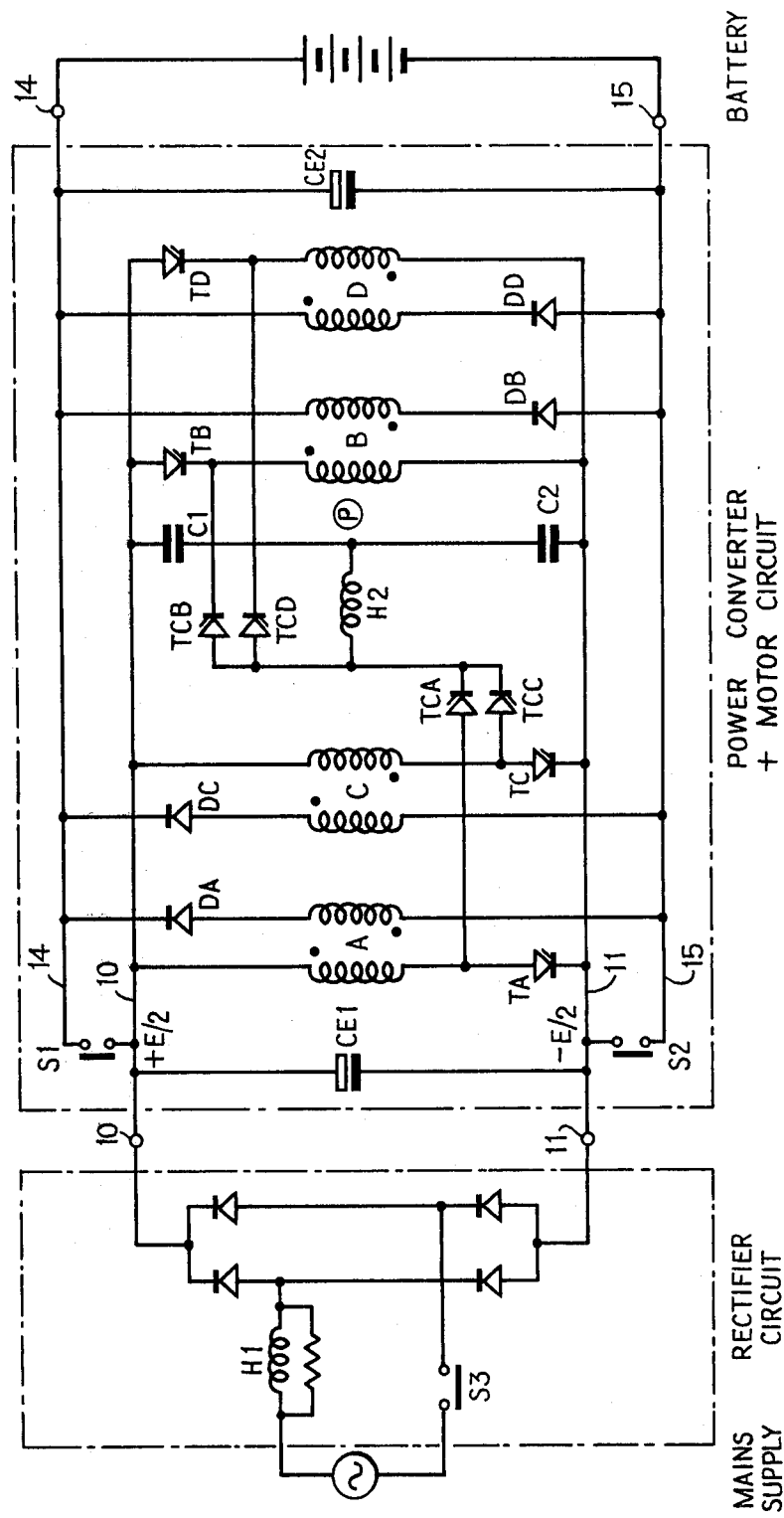
FIG. 2 is a circuit diagram of one four-phase arrangement.

FIG. 2 shows one example of the proposed battery charging system in which the rectifier comprises four diodes, a current limiting inductor H1, and an electromechanical switch or contactor S3. The rectifier supplies a direct current to a storage capacitor CE1 of the power convertor which absorbs the fluctuation of current at the D.C. supply terminals and maintains the voltage across the capacitor CE1 at a value E volts.

The power convertor and motor circuit is of a type described in U.S. Pat. No. 4,253,053 for driving the motor. It incorporates a variable reluctance motor having four phases A, B, C and D with closely coupled main and auxiliary windings on each phase having, for example, a 1:1 turns ratio.

Each main winding is connected in series with a main thyristor TA, TB, TC or TD between the DV supply terminals 10 and 11 (which are shunted by a storage capacitor CE1) while each auxiliary winding is connected in series with a diode DA, DB, DC or DD between battery terminals 14 and 15 (which are shunted by a storage capacitor CE2). The junction of each main winding and its main thyristor is connected through a commutating thyristor TCA, TCB, TCC or TCD, and an inductor H2, to the junction P of a pair of commutating capacitors $C_1$ $C_2$ connected across the D.V. supply terminals 10 and 11.

Electromechanical switches S1 and S2 serve to connect the battery terminals 14, 15 to the D.V. supply terminals 10, 11 when the motor is to be driven.

The inductor H2 serves to limit the initial rate of increase of current in the commutating thyristors when these are fired, and since its presence is otherwise incidental to the operation of the circuit it will not be further referred to. Additional switches (not shown) may be required for completely isolating the battery when the power system is inoperative.

The switches S1 and S2 enable the power convertor circuit to be used for either driving the motor or for charging the battery. For motoring operation S1 and S2 are closed, and the capacitors CE1 and CE2 are in parallel and act as one capacitor. For battery charging S1 and S2 are open as shown thereby isolating the entire power convertor circuit from the battery with the exception of the auxiliary diodes and the capacitor CE2.

Figure 3:
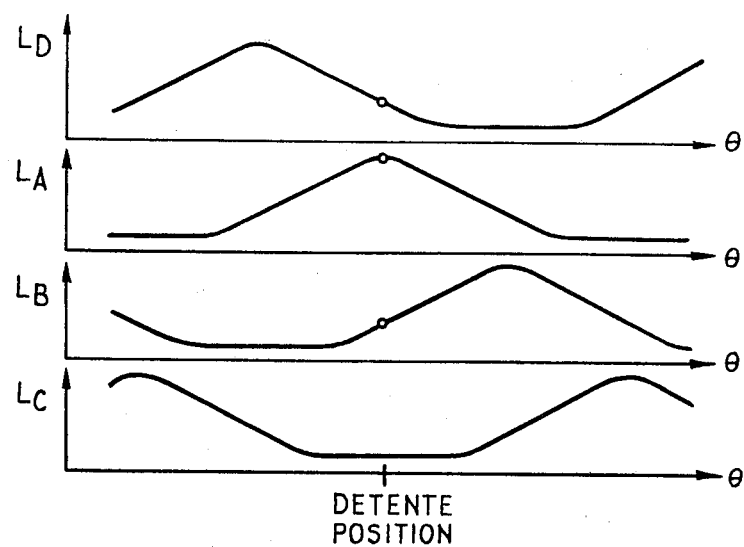
FIG. 3 is a graph of inductance against rotor position for a four-phase arrangement.

FIG. 3 illustrates the variation of motor winding inductance L for each phase with rotor position $\theta$ for a typical motor. Prior to the commencement of charging the electronic controller establishes by means of a known rotor position transducer which phase of the stationary motor is closest to its maximum inductance position. For example let this be phase A.

Switch S3 is closed and the rectifier charges the capacitor CE1 to E volts. Since the circuit is symmetrical the voltage on the D.C. supply terminals 10 and 11 will be taken as $+E/2$ and $-E/2$ respectively. With respect to these voltages the voltage VP at point P on the commutation capacitors C1 and C2 will initially be zero.

The commutating thyristor TCA is now fired and current flows through the main winding of phase A into the capacitor C1 and C2, resonantly charging C1 and C2 until the voltage VP at the point P is approximately $+E$ volts when the current falls to zero and the thyristor TCA turns off. This pulse of current creates a motor torque according to the well known principle that instantaneous torque$=\frac{1}{2}i^2$ ($dL/d\theta$) where i is the instantaneous current and $dL/d\theta$ is the rate of increase of phase inductance with rotor angle. This pulls the rotor into the position where the inductance of phase A is a maximum as shown in FIG. 3. It will be seen that for this position the inductance of the adjacent phases B and D are the same, but have equal and opposite values of $dL/d\theta$.

The commutating thyristors TCB and TCD of adjacent phases are now fired simultaneously so that current flows from the capacitors C1 and C2 through the main windings of B and D. The capacitor voltage VP is thus resonantly reversed until it becomes equal to $-3E/2$ when the diodes DB and DD become forward biased and the currents transfer to the auxiliary windings of phases B and D, thereby flowing into the battery. While the battery current flows the auxiliary windings have a voltage across them which causes the currents in each of them to decay to zero. The commutating thyristors TCB and TCD turn off when the current transfers to the diodes DB and DD.

Since the inductances for phases B and D for the prescribed rotor position are equal or very nearly equal, and the same voltage is applied to each when current is building up in the main winding and decaying in the auxiliary winding, the instantaneous values of current in B and D will be the same or very nearly the same. However, $dI/d\theta$ is equal and opposite for the two phases and hence the torques produced will cancel each other out, there being no or very little net torque to move the rotor from its prescribed position.

Suppose the rotor position $\theta$ were to move a small positive amount $\Delta\theta$ from the prescribed position. Then with reference to FIG. 3 the inductance of D will decrease and the inductance of B will increase. Current will therefore build up in D faster than in B giving rise to a greater torque from phase D for which $dL/d\theta$ is $-ve$ and this torque will return the rotor to its prescribed position. Hence the prescribed rotor position is one of stable equilibrium. With TCB and TCD off and VP$=-3E/2$, the commutating thyristor TCA is now refired so that current builds up in the main winding of A and VP is resonantly reversed to $+3E/2$. Since for phase A with the rotor in its prescribed detente position $dL/d\theta$ is zero, no torque should be developed to move it from that position although were phase A slightly displaced from its detente position the torque developed would return it to this position. Hence again the prescribed rotor position is one of stable equilibrium.

When VP reaches $+3E/2$, diode DA becomes forward biased and the current transfers to the auxiliary winding of phase A and hence into the battery, and TCA turns off.

Figure 4:
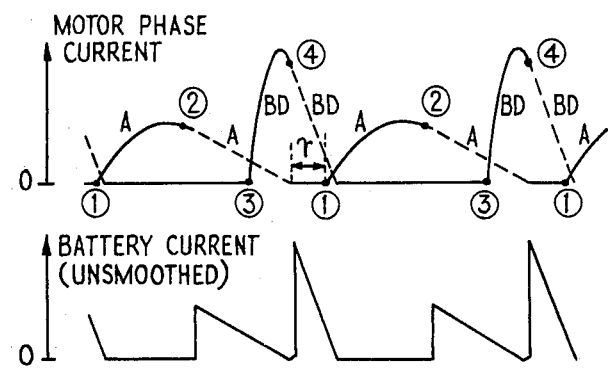
FIGS. 4 to 6 are graphs of current.

Hence by repetitively firing the commutating thyristor TCA of phase A followed by the commutating thyristors TCB and TCD of the adjacent phases B and D together, current is drawn from CE1 into the main windings of phases A, B and D and then transferred via their auxiliary windings into the battery, the commutating capacitor voltage VP alternating from $+3E/2$ to $-3E/2$. FIG. 4 shows the current waveforms for phase A and for the sum of the currents in phases B and D combined. Auxiliary winding current is shown by a dashed-line and main winding current by a continuous line. TCA is fired at points (1) and current transfers from the main to the auxiliary winding of A at points (2). TCB and TCD are fired at points (3) and current transfers from the main to auxiliary windings of phases B and D at points (4).

The current supplied by the auxiliary windings to the capacitor CE2 and the battery is shown in the lower part of FIG. 4. Although unidirectional, it will be seen that this current is pulsating, and the presence of the capacitor CE2 is to bypass the majority of the alternative component so that a relatively smooth current flows to the battery.

It will be seen from FIG. 4 that the current in phase A is discontinuous and the mean level of current flowing to the battery may be varied by varying the time $\tau$ for which no current flows up to the point that $\tau=0$.

Figure 5:
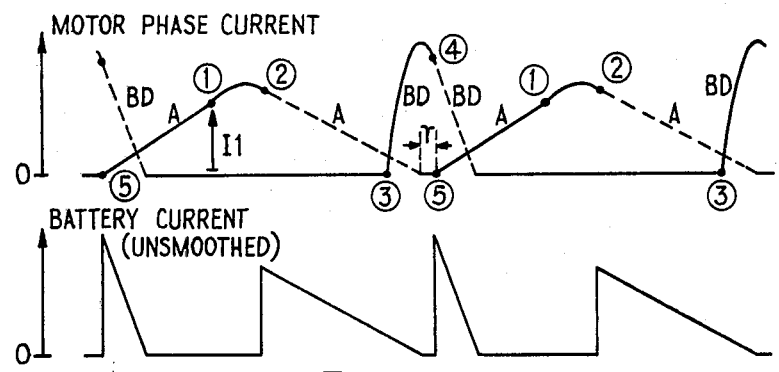

FIG. 5 illustrates how if a higher level of current is required for the battery, this may be obtained by also firing the main thyristor TA. In other respects the current waveforms of FIG. 5, take the same form as in FIG. 4. With the commutating capacitor voltage $VP = -3E/2$ and no current in phase A, the main thyristor TA of phase A is fired at point (5) so that current builds up in the main winding of phase A, until it reaches a value I1 at point (1) at which the commutating thyristor TCA is fired. The voltage at the anode of TA becomes equal to VP $(=-3E/2)$ and the current I1 flows into the capacitors C1 and C2 such that VP increases positively from $-3E/2$. TA is reverse biased for sufficiently long to ensure it remains turned off when VP becomes greater than $-E/2$. VP continues to increase until it reaches $+3E/2$ at point (2) when the current transfers to the auxiliary winding and thence into the battery. The remaining cycle of events is as described above for FIG. 4.

The mean level of current flowing to the battery may be varied by varying either the value of I1 or the time $\tau$ for which no current flows.

Figure 6:
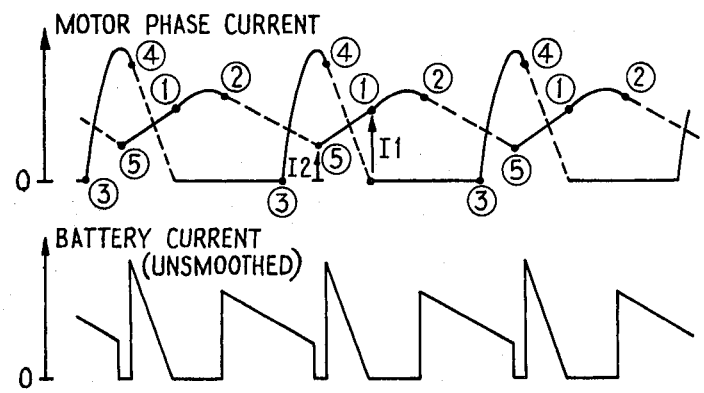

FIG. 6 illustrates an alternative way to vary the current supplied to the battery. This is to fire the main thyristor TA before the current in phase A falls to zero. Typical current waveforms are shown in FIG. 6. When the current in the auxiliary winding of phase A has decayed to a level I2 the main thyristor TA is fired (point (5)). This causes a reverse voltage to be applied to the diode DA and the current transfers to the main winding of phase A where it builds up under the influence of the supply voltage E until it reaches a value I1 (point (1)) when the commutating thyristor TCA is fired, the remaining cycle of events being as previously described. By varying the levels I1 and/or I2 the battery charging current may be varied.

The circuit operation is similar if a phase other than phase A is closest to its maximum inductance value prior to the commencement of charging. The commutating and main thyristors, of this phase, together with the commutating thyristors of its adjacent phases, are used in exactly the same manner as described above.

Other power convertor circuit and motor configurations may be used for battery charging provided the motor has closely coupled main and auxiliary windings for each phase.

Figure 7:
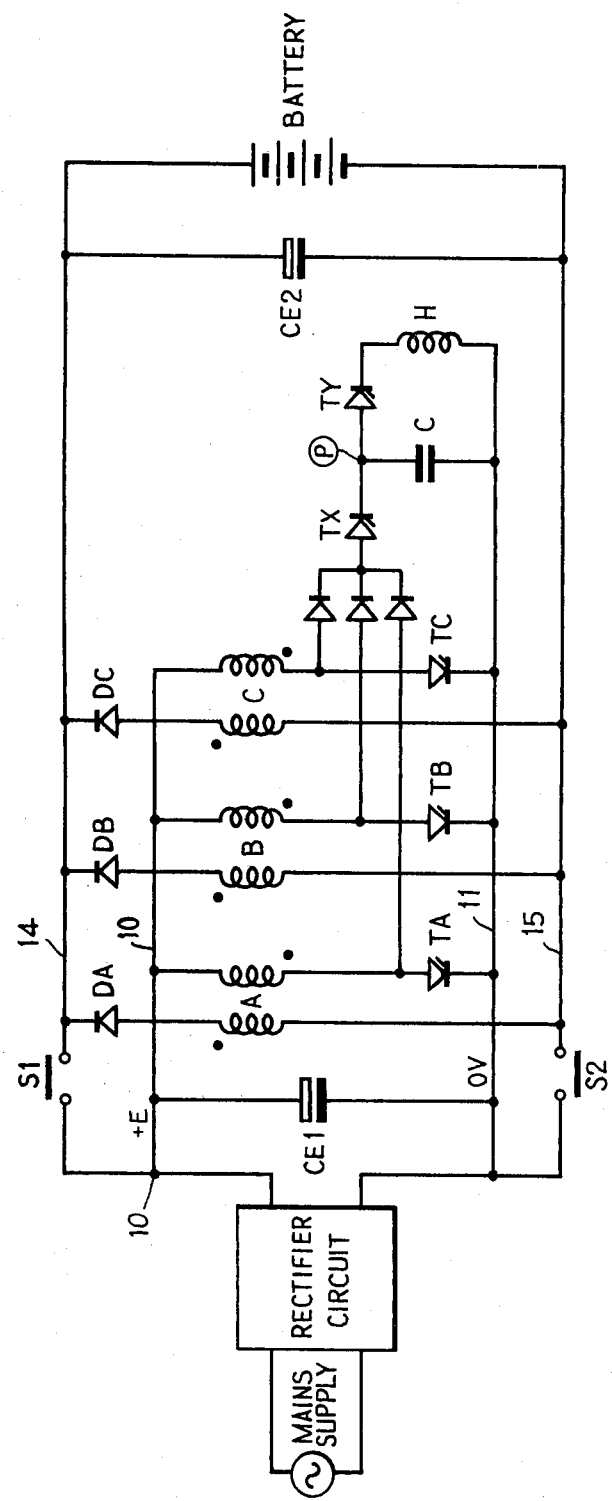
FIGS. 7 and 8 are circuit diagrams of two three-phase arrangements.
Figure 8:
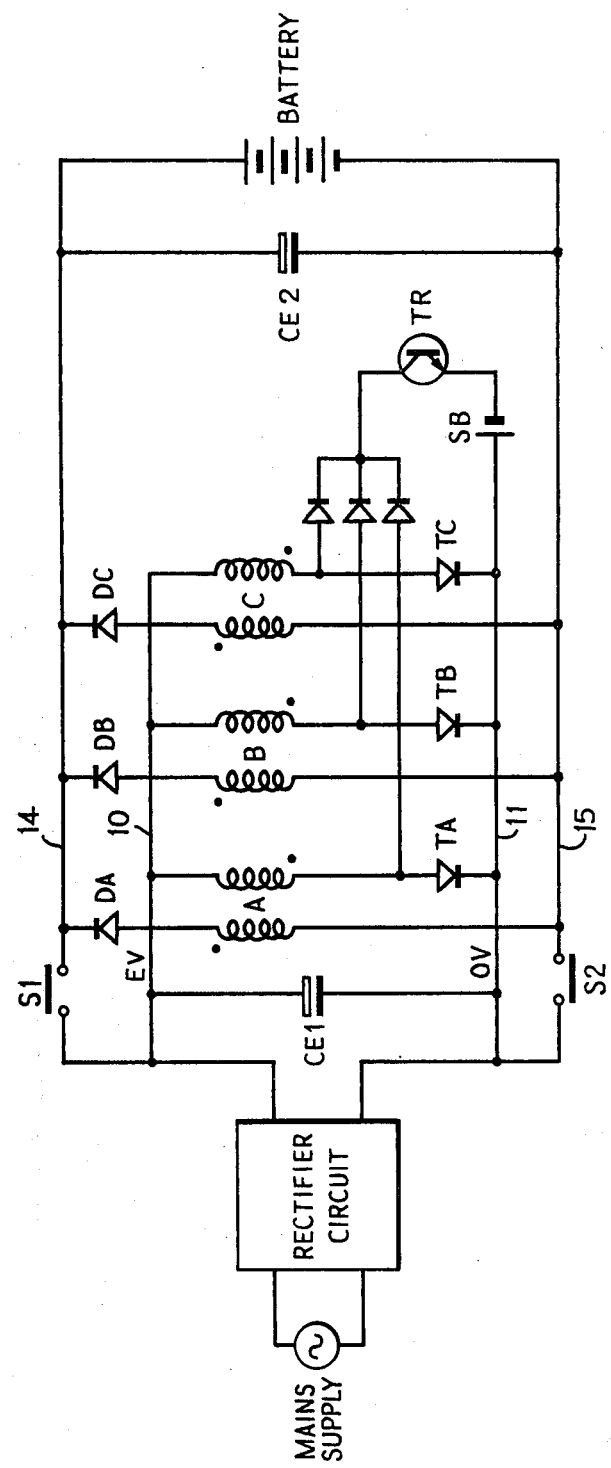

FIGS. 7 and 8 show two such 3-phase circuits whose operation when used for driving the motor is described in our previous British patent applications Nos. 13416/77 and 13415/77 (U.S. Pat. No. 4,253,053)

In the circuit of FIG. 7 all three main windings are connected to the terminal 10 and the main thyristors to the terminal 11, while all three auxiliary windings are connected to the terminal 15 and all the diodes to the terminal 14. The three phases share a commutating thyristor TX and capacitor C which is shunted by a resetting thyristor TY in series with an inductor H for resonantly reversing the charge on the capacitor C.

Figure 9:
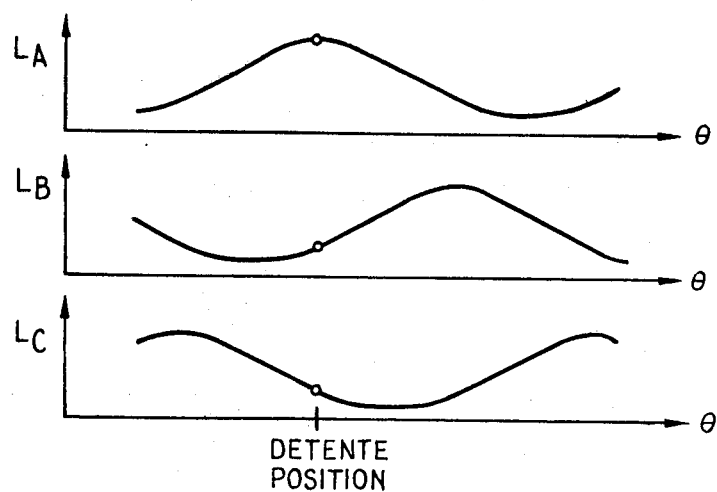
FIG. 9 is a graph of inductance for a three-phase arrangement.

FIG. 9 shows the variation of inductance L with rotor position $\theta$ for the three phases of the motor with a typical detente position indicated for the energisation of all three phases simultaneously.

In the circit of FIG. 7 when the rectifier is energised it charges the capacitor CE1 to E volts, and, for the purpose of describing the operation the potential at the negative terminal 11 of CE1 will be taken as zero and that of the positive terminal 10 as $+E$. Initially the voltage VP on the commutation capacitor C at point P is zero.

The commutating thyristor TX is fired and current builds up in all three motor phase main windings, resonantly charging the capacitor C so that VP becomes $+2E$. The pulses of phase currents produce a torque to move the rotor to its nearest detente position. For example let this be with phase A at its maximum inductance as shown in FIG. 9.

The resetting thyristor TY is now fired and the voltage VP on the capacitor C is resonantly reversed to $-2E$, as current flows through the inductor H. The main thyristor TA is fired next so that current builds up in the main winding of phase A. When the current reaches an appropriate level I1, the commutating thyristor TX is fired so that the voltage on the anode of TA becomes equal to VP and TA is reverse biassed and turns off. The capacitor C is now charged by the current in the main winding of A, and by current building up in the main windings of B and C, and VP changes positively until $VP = +2E$ when the diodes DA, DB, DC become forward biassed and the current transfers from each main winding to its auxiliary winding and thence flows into the battery.

The resetting thyristor TY is now fired to resonantly reverse VP from $+2E$ to $-2E$ ready for the next commutation of current from TA.

Hence by sequentially firing TA, followed by TX, followed by TY, current is built up in the main motor windings from the supply E and then transferred to the auxiliary windings to charge the battery.

TA may be refired when the current in the auxiliary winding of A has decayed to some appropriate level I2, in which case on firing TA,I2 will transfer back to the main winding and will build up to I1 at which point TX is fired to commutate TA as before, or alternatively TA may be refired after the current in the auxiliary winding of A is zero.

As an alternative to the above TA, TB, and TC may all be fired together and then commutated by firing TX as before.

As a further alternative, for charging the battery at a lower current level, only TX and TY need be fired alternately. Each time TX is fired current builds up in all three main windings and when VP charges up to $VP=+2E$ the currents transfer to their respective auxiliary windings, thereby charging the battery. After TX has turned off TY is fired to resonantly reverse VP to −2E.

The power converter circuit of FIG. 8 is similar to that of FIG. 7 except that it utilizes a transistor TR and auxiliary battery SB in place of the commutation circuit of FIG. 7. TR may be a single transistor or an array of transistors connected so as to operate as one. As for the circuit of FIG. 7, the rectifier maintains E volts across CE1 and the switching devices may be operated in various ways for charging the battery.

One method is to turn on and turn off the transistor TR at repeated intervals. When TR is turned on current builds up in the main windings of all three phases, and when TR is turned off these currents transfer to the respective auxiliary windings and flow into the battery, decaying under the influence of the battery voltage.

Another method is to fire the main thyristor of the phase for which the inductance is greatest, thereby pulling the rotor into its detente position. Let this phase be phase A. Then current will build up in the main winding of phase A. TR is now fired causing a reverse voltage across TA which thereupon turns off. The current in the main winding of phase A continues to build up, and currents in the other main windings commence to build up, all flowing through TR and into the auxiliary battery SB. TR is now turned off and the currents transfer to their auxiliary windings and thence into the battery as before.

Hence by repetitively firing TA and turning TR on and off in sequence, a charging current may be supplied to the battery. TA may be refired before the current in phase A has decayed to zero.

In similar ways all of the power convertor circuits of our previous British patent specification No. 13416/77 may be used for the purpose of battery charging in addition to the purpose of driving the variable reluctance motor as described in that specification.

The rectifier circuit of FIG. 2 is an uncontrolled rectifier with a current limiting inductor H1 which has the effect that as the battery charging current, and hence the current drawn from the rectifier, increases, so the mean D.C. voltage output of the rectifier decreases.

Figure 10:
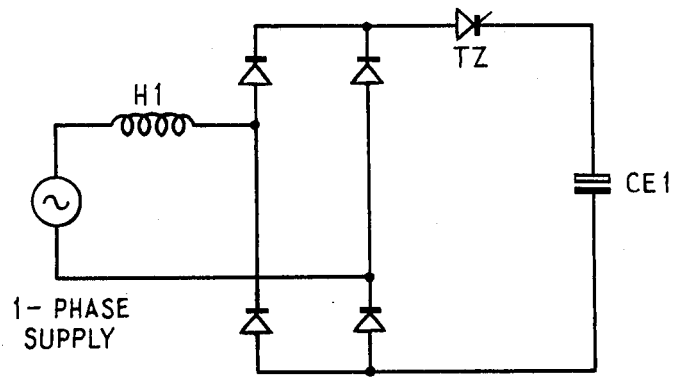
FIGS. 10 and 11 are circuit diagrams of a single phase rectifier arrangement and of a three phase rectifier arrangement.

FIG. 10 shows a controlled rectifier in which the switch S3 of FIG. 2 has been replaced by a thyristor TZ. By controlling the firing angle of TZ with respect to the mains supply the means output voltage of the rectifier may be regulated at an appropriate level.

Figure 11:
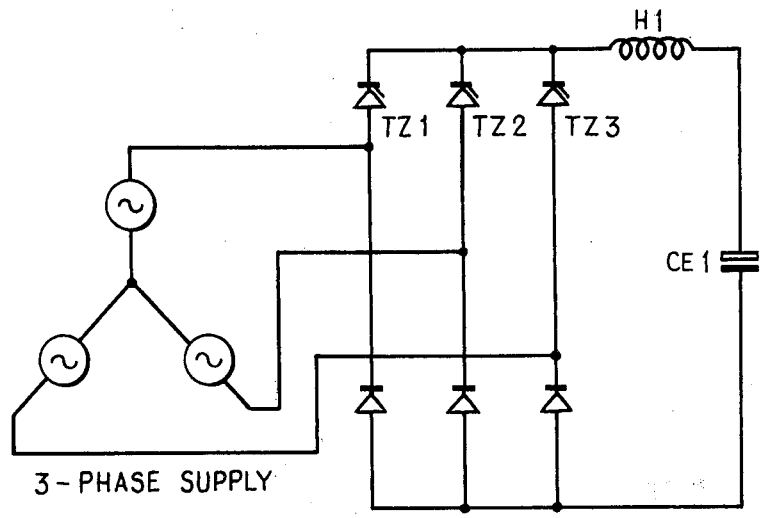

The rectifier circuit may, if required, operate from a three phase mains supply together with any of the power converter circuits described above. A suitable 3-phase half-controlled rectifier circuit is shown in FIG. 11.

For the purpose of supplying a power convertor circuit of the types described above with a rectified voltage, so that the battery may be charged in one of the manners described in this application, any known single phase or multiphase rectifier, operating from the appropriate alternating voltage supply may suffice.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A variable reluctance electric motor system including a variable reluctance motor having main windings and auxiliary windings closely coupled to the main windings, a main storage battery for driving the motor, D.C. supply terminals, and a power converter circuit for charging the battery from an external D.C. supply, in which the motor is included in the power converter circuit to function as an isolating transformer to isolate the battery from the supply when on charge, and including switch means for disconnecting the battery from the main windings during charging.

2. A system as claimed in claim 1 in which the power converter circuit includes solid state switching devices supplying unidirectional pulses of current to a winding of each of one or more phases, such pulses being synchronized with the rotation of the motor when driving the motor, but free-running when charging the battery.

3. A system as claimed in claim 2 in which each phase of the motor has a main winding connected in series with a main thyristor between the D.C. supply terminals, and an auxiliary winding closely coupled with the main winding and connected in series with a diode across terminals of the battery, means being provided for firing and commutating the main thyristors, and means for connecting the D.C. supply terminals to a rectified A.C. main supply for charging the battery, and means for connecting the D.C. supply terminals to the battery terminals for driving the motor.

4. A system as claimed in claim 2 including a current transducer arranged to control the commutation of the switching devices to take place when the main winding current reaches a predetermined value, when charging the battery.

5. A system as claimed in claim 4 including timing means arranged to introduce a predetermined time interval between pulses, when charging the battery.

6. A system as claimed in claim 5 in which each pulse is initiated under the control of a timer and commutated under the control of a current transducer when the current reaches a predetermined value.

7. A system as claimed in claim 3 in which the means for commutating the main thyristors include a commutating thyristor for each phase connecting the junction of the main winding and main thyristor to a capacitor, and for the charging mode, means for sequentially firing a commutating thyristor of one phase and then simultaneously firing both commutating thyristors of two adjacent phases, and repeating the sequence.

8. A system as claimed in claim 7 including means for sequentially firing the main thyristor of one phase then firing the commutating thyristor of that phase, and then simultaneously firing both commutating thyristors of two adjacent phases, and repeating the sequence.

9. A system as claimed in any one of claims 3 to 8 in which the motor has four phases of which three are used during the charging mode.

10. A system as claimed in claim 3 in which the motor has three phases all three of which are used in the charging mode.

11. A system as claimed in claim 3 in which the motor has three phases and a single commutating thyristor common to all three for connecting the junction of the main winding and main thyristor to a capacitor, and a resetting thyristor connecting an inductor across the said capacitor, to resonantly reverse its charge, and means is provided for sequentially firing the said commutating thyristor and then firing the resetting thyristor, and repeating the sequence.

12. A system as claimed in claim 11 including means for sequentially firing at least one main thyristor and then firing the commutating thyristor and then firing the resetting thyristor, and repeating the sequence.

13. A system as claimed in claim 3 in which the means for commutating the main thyristor comprise a transistor and an auxiliary battery and means is provided for sequentially turning the transistor on and then turning it off, and repeating the sequence.

14. A system as claimed in claim 13 in which means is provided for sequentially firing a main thyristor and then switching the transistor on, and then switching the transistor off, and repeating the sequence.

15. An electric battery-propelled vehicle including a system as claimed in any one of the preceding claims, with the variable reluctance motor arranged to propel the vehicle.

16. A system as claimed in claims 1, 2 or 3, including a controllable rectifier providing the D.C. supply from A.C. main and feedback controls controlling the rectifier to prevent the D.C. supply voltage from becoming excessively high.

* * * * *